US007209745B1

(12) United States Patent
Sebastian et al.

(10) Patent No.: US 7,209,745 B1
(45) Date of Patent: Apr. 24, 2007

(54) CELLULAR WIRELESS RE-USE STRUCTURE THAT ALLOWS SPATIAL MULTIPLEXING AND DIVERSITY COMMUNICATION

(75) Inventors: Peroor K. Sebastian, Mountain View, CA (US); Arogyaswami J. Paulraj, Stanford, CA (US)

(73) Assignee: Intel Corporation, Santa Clara, CA (US)

(*) Notice: Subject to any disclaimer, the term of this patent is extended or adjusted under 35 U.S.C. 154(b) by 1313 days.

(21) Appl. No.: 09/591,015

(22) Filed: Jun. 9, 2000

(51) Int. Cl.
*H04Q 7/20* (2006.01)

(52) U.S. Cl. ............... 455/447; 455/442; 455/443; 455/446; 455/450; 455/464; 455/509; 370/431

(58) Field of Classification Search ............ 455/443, 455/446–447, 448, 422, 501, 63, 561, 562, 455/560, 10, 63.1, 422.1, 450, 464, 504, 455/506, 509, 436–439, 442, 456.1, 500; 370/319–321, 344–347, 329–330, 341, 431, 370/436
See application file for complete search history.

(56) References Cited

U.S. PATENT DOCUMENTS

| | | | | |
|---|---|---|---|---|
| 5,109,390 A | * | 4/1992 | Gilhousen et al. | 370/335 |
| 5,267,261 A | * | 11/1993 | Blakeney et al. | 370/332 |
| 5,355,367 A | * | 10/1994 | Comroe et al. | 370/329 |
| 5,625,876 A | * | 4/1997 | Gilhousen et al. | 370/331 |
| 5,642,353 A | * | 6/1997 | Roy, III et al. | 370/329 |
| 5,649,292 A | * | 7/1997 | Doner | 455/447 |
| 5,761,196 A | * | 6/1998 | Ayerst et al. | 370/335 |
| 5,815,488 A | | 9/1998 | Williams et al. | 370/206 |

(Continued)

FOREIGN PATENT DOCUMENTS

WO    98/09385    3/1998

(Continued)

OTHER PUBLICATIONS

Paulraj, A., *Taxonomy of space-time processing for wireless networks*, IEE Proc—Radar Sonar Navig., vol. 145, No. 1, Feb. 1998.

*Primary Examiner*—William Trost
*Assistant Examiner*—James D. Ewart
(74) *Attorney, Agent, or Firm*—James S. Finn (57) ABSTRACT

The present invention includes a cellular wireless re-use communication system. The communication system includes a base transceiver station cluster. The base transceiver station cluster includes a first plurality of base station transceivers and a plurality of common channel areas. Each common channel area includes a unique set of common assigned channels. Each common channel area further includes at least one subscriber unit. Each subscriber unit within the common channel area receives information signals from a second plurality of base station transceivers through one of the set of common assigned channels that correspond to the common channel area. The common assigned channel includes common transmission characteristics. The common transmission characteristic can include a transmission frequency, a transmission time or a transmission code. The second plurality of base station transceivers can be physically located within the same common channel area that a corresponding subscriber unit receiving information from the second plurality of base station transceivers is located. Alternatively, at least one of the second plurality of base station transceivers can be physically located outside of the common channel area that a corresponding subscriber unit receiving information from the second plurality of base station transceivers is located.

20 Claims, 9 Drawing Sheets

U.S. PATENT DOCUMENTS

| | | | |
|---|---|---|---|
| 5,901,356 A * | 5/1999 | Hudson | 455/451 |
| 5,933,421 A | 8/1999 | Alamouti et al. | 370/330 |
| 5,946,621 A * | 8/1999 | Chheda et al. | 455/440 |
| 5,956,641 A * | 9/1999 | Bruckert et al. | 455/442 |
| 6,002,935 A * | 12/1999 | Wang | 455/447 |
| 6,009,328 A * | 12/1999 | Muszynski | 455/442 |
| 6,058,105 A | 5/2000 | Hochwald et al. | 370/310 |
| 6,064,662 A | 5/2000 | Gitlin et al. | 370/330 |
| 6,085,092 A * | 7/2000 | Schmidt | 455/447 |
| 6,091,955 A * | 7/2000 | Aalto et al. | 455/447 |
| 6,097,771 A | 8/2000 | Foschini | 375/346 |
| 6,144,711 A | 11/2000 | Raleigh et al. | 375/347 |
| 6,216,004 B1 * | 4/2001 | Tiedemann et al. | 455/442 |
| 6,414,947 B1 * | 7/2002 | Legg et al. | 370/331 |
| 6,757,524 B1 * | 6/2004 | Hartikainen et al. | 455/101 |
| 6,807,420 B2 * | 10/2004 | Ohtani et al. | 455/436 |
| 6,907,243 B1 * | 6/2005 | Patel | 455/442 |
| 6,909,707 B2 * | 6/2005 | Rotstein et al. | 370/342 |
| 2001/0012280 A1 * | 8/2001 | Dent | 370/335 |
| 2002/0061750 A1 * | 5/2002 | Mohebbi | 455/437 |

FOREIGN PATENT DOCUMENTS

| | | |
|---|---|---|
| WO | WO98/09381 | 5/1998 |

* cited by examiner

CELLULAR WIRELESS RE-USE STRUCTURE THAT ALLOWS SPATIAL MULTIPLEXING AND DIVERSITY COMMUNICATION

FIELD OF THE INVENTION

The invention relates generally to wireless communications. More particularly, the invention relates to cellular wireless re-use structures that allow spatial processing using multiple antennae.

BACKGROUND OF THE INVENTION

Wireless communication systems commonly include information carrying modulated carrier signals that are wirelessly transmitted from a transmission source to one or more receivers within an area or region.

Figure 1:
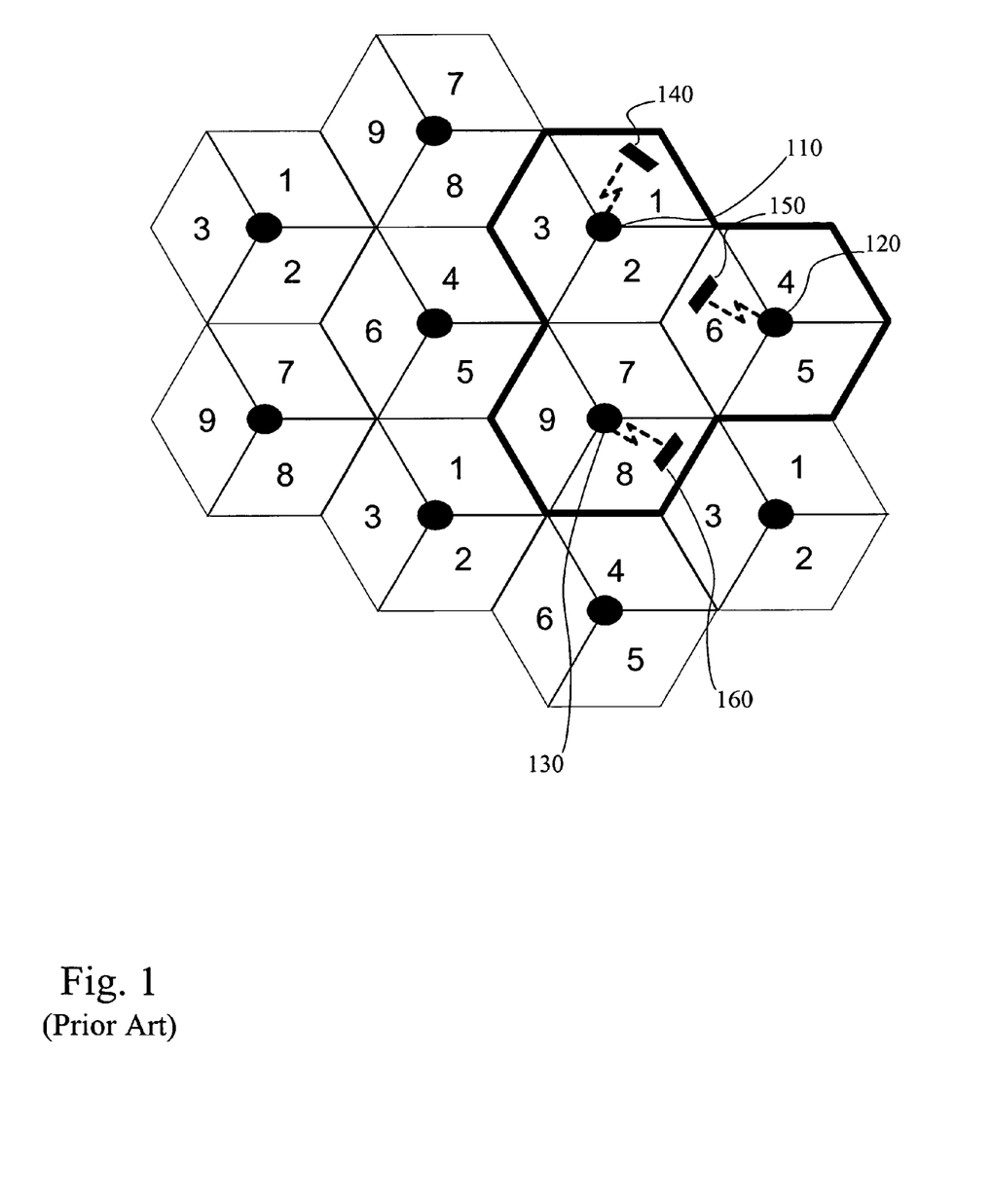
FIG. 1 shows a prior art cellular array system.

FIG. 1 shows a prior art wireless cellular array system. The cellular array system of FIG. 1 includes clusters of cells with a base station transceiver at the center of each cell. A first cluster (high-lighted) includes a first base station transceiver 110, a second base station transceiver 120 and a third base station transceiver 130. The first base station transceiver 110 is included within a first cell, and includes sectors designated as 1, 2 and 3. The second base station transceiver 120 is included within a second cell, and includes sectors 4, 5 and 6. The third base station transceiver 120 is included within a third cell, and includes sectors 7, 8 and 9.

The sectors 1, 2, 3, 4, 5, 6, 7, 8 and 9 each include unique transmission channels. That is, the transmission characteristics of information signals from the base station transceivers 110, 120, 130 within each sector is unique from the transmission characteristics of the other sectors within the first cluster. For example, the transmission frequency in sector 1 can be at a first frequency, whereas the transmission frequencies of the other sectors include different transmission frequencies. The transmission channels can be uniquely defined by transmission frequency, transmission time, transmission code or any other transmission technique that includes independent transmission channels.

The prior art cellular array systems generally include clusters being repeated. Therefore, the transmission characteristics of each cluster are repeated. The process of repeating transmission frequencies by repeating clusters is generally termed frequency re-use.

A limitation of repeating transmission characteristics is that the cellular array system suffers from co-channel interference. Each cluster within the cellular array system includes the same set of transmission channels having common transmission characteristics as every other cluster within the cellular array system. Therefore, interference occurs between common transmission characteristic cells of different clusters, causing co-channel interference.

To optimize frequency spectrum allocations, frequency re-use cellular array systems repeat transmission frequencies from cluster to cluster. The amount of co-channel interference between cells of neighboring clusters determines how frequently the transmission frequencies can be re-used, and how close cells having common transmission characteristics can be located.

Receivers within a given sector of the prior art cellular array systems receive information signal from a corresponding base station transceiver. For example, a first receiver 140 within the first sector 1 generally receives only information signals from first base station transceiver 110. A second receiver 150 within the sixth sector 6 generally receives only information signals from the second base station transceiver 120. A third receiver 160 within the eighth sector 8 generally receives only information signals from the third base station transceiver 130.

The ability of wireless systems to transmit information between transmitters and receivers is made difficult by inherent characteristics of the propagation of the transmitted signals through the surrounding environment. The transmitted signals travel along multiple paths before reaching a receiving antenna. The transmitted signals experience different levels of attenuation and propagation delays due to terrain and signal reflections. The attenuation and propagation delays are dependent on the frequency of the transmitted signals. The result is a communication channel that exhibits fading and delay spread.

It is desirable to have an apparatus and method that provides a cellular wireless communication system that can provide enhanced information transmission capacity, minimize the effects of fading, while allowing for re-use of information carrying signals having common transmission characteristics.

SUMMARY OF THE INVENTION

The invention includes an apparatus and a method for a wireless cellular communication system that provides a cellular wireless communication system that can provide enhanced information transmission capacity, minimize the effects of fading, and allows for re-use of information carrying signals having common transmission characteristics.

A first embodiment of the invention includes a cellular wireless re-use communication system. The communication system includes a base transceiver station cluster. The base transceiver station cluster includes a first plurality of base station transceivers and a plurality of common channel areas. Each common channel area includes a unique set of common assigned channels. Each common channel area further includes at least one subscriber unit. Each subscriber unit within the common channel area receives information signals from a second plurality of base station transceivers through a single one of the set of common assigned channels that correspond to the common channel area.

A second embodiment is similar to the first embodiment. The second embodiment includes common assigned channel having a common transmission characteristics. The common transmission characteristic can include a transmission frequency, a transmission time or a transmission code. For example, the common transmission characteristic can include a frequency-division, a time-division, a spatial-division, a code-division, orthogonal frequency division multiple access (OFDMA), wavelength division multiple access (WDMA), or wavelet division multiple access techniques.

A third embodiment is similar to the first embodiment. The third embodiment includes the second plurality of base station transceivers being physically located within the same common channel area that a corresponding subscriber unit that is receiving information from the second plurality of base station transceivers is located.

A fourth embodiment is similar to the first embodiment. The fourth embodiment includes at least one of the second plurality of base station transceivers being physically located outside of the common channel area that a corresponding subscriber unit that is receiving information from the second plurality of base station transceivers is located.

A fifth embodiment is similar to the first embodiment. The fifth embodiment includes the subscriber unit receiving information signals from a second plurality of base station transceivers through at least one of the set of common assigned channels, allowing for spatial multiplexing.

A sixth embodiment is similar to the first embodiment. The sixth embodiment includes the subscriber unit receiving information signals from a second plurality of base station transceivers through a one of the set of common assigned channels, allowing for communication diversity. The communication diversity can include transmitter diversity and/or receiver diversity.

A seventh embodiment includes a cellular wireless re-use communication system. The communication system includes a plurality of base transceiver station clusters. Each base transceiver station cluster includes at least one base station transceiver and at least one common channel areas. Each common channel area has a unique set of common assigned channels. Each common channel area includes at least one subscriber unit. Each subscriber unit within the common channel area receives information signals from a second plurality of base station transceivers through at least one of the set of common assigned channels that correspond to the common channel area.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in an apparatus and a method for a wireless cellular communication system that provides re-use of information carrying signals, provides for minimization of the effects of fading and delay spread, and allows for enhanced information transmission capacity.

Figure 2:
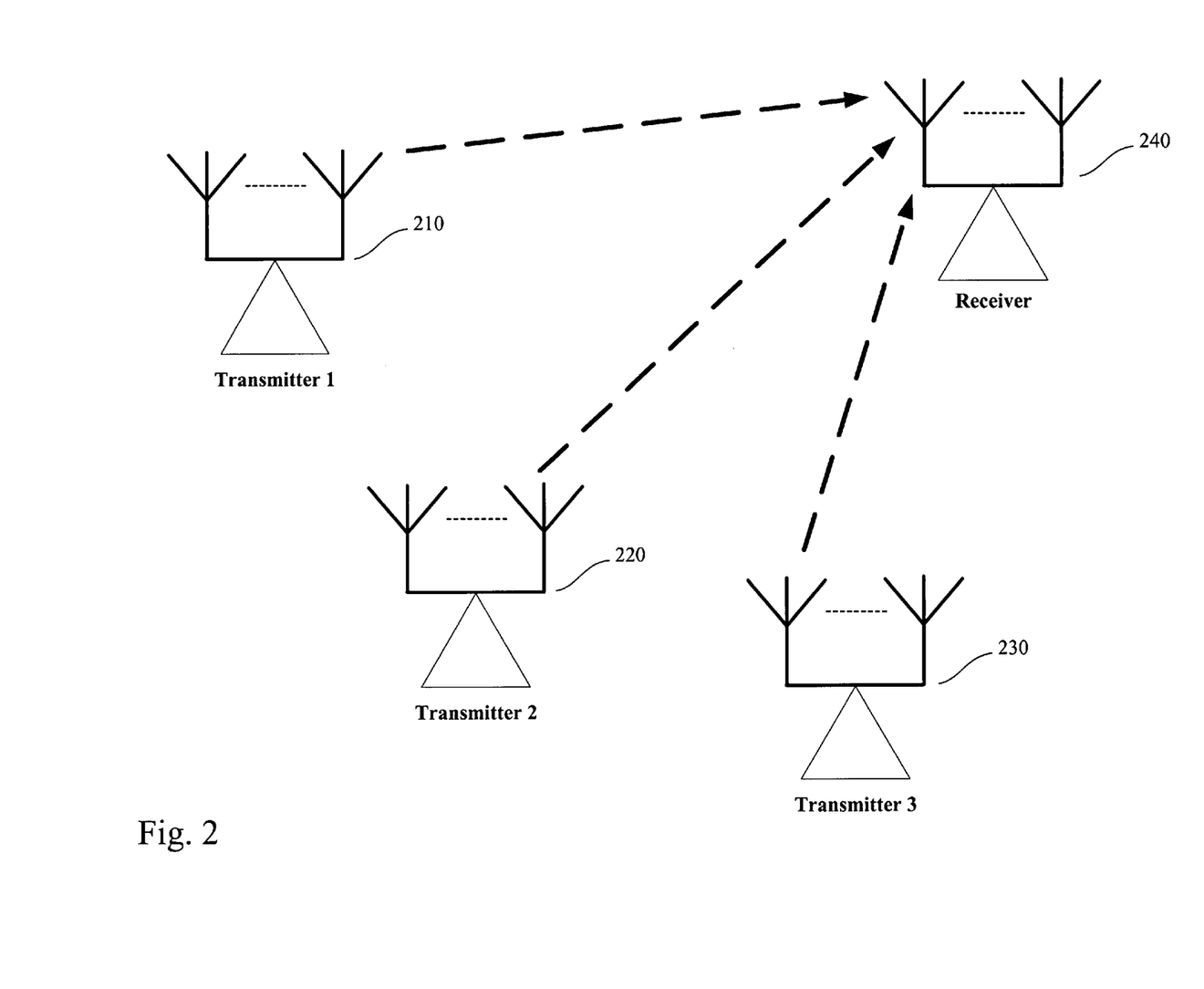
FIG. 2 shows a receiver receiving information signals from a plurality of transmitters.

FIG. 2 shows a multiple antenna system. Signals transmitted from a first transmitter 210, a second transmitter 220 and a third transmitter 230 are received by a receiver 240. The quality of wireless communications systems can be improved through the use of adaptive spatial processing using multiple antennae. Adaptive antenna processing can be used to improve bit error rate, data rate or spectral efficiency in wireless communication systems. Spatial multiplexing and diversity communication are two prominent spatial processing techniques provided by multiple antenna systems.

Spatial multiplexing is a transmission technology that exploits multiple antennas at both the base transceiver station and at the subscriber units to increase the bit rate in a wireless radio link with no additional power or bandwidth consumption. Under certain conditions, spatial multiplexing offers a linear increase in spectrum efficiency with the number of antennas. For example, if N=3 antennas are used at the transmitter (base transceiver station) and the receiver (subscriber unit), the stream of possibly coded information symbols is split into three independent substreams. These substreams occupy the same channel of a multiple access protocol, the same time slot in a time-division multiple access protocol, the same frequency slot in frequency-division multiple access protocol, the same code sequence in code-division multiple access protocol or the same spatial target location in space-division multiple access protocol. The substreams are applied separately to the N transmit antennas and transmitted through a radio channel. Due to the presence of various scattering objects in the environment, each signal experiences multipath propagation.

The composite signals resulting from the transmission are finally captured by an array of receiving antennas with random phase and amplitudes. At the receiver array, a spatial signature of each of the N signals is estimated. Based on the spatial signatures, a signal processing technique is applied to separate the signals, recovering the original substreams.

Two types of spatial multiplexing implementations are possible. The first includes a single base station transceiver, the second includes multiple base station transceivers. In the single base station transceiver implementation, the transmitter antennas that are used for multiplexing are elements of an antenna array at a base transceiver station. In the multiple base station transceivers implementation, transmitter antenna elements or antenna arrays are located at two or more base station transceivers. The multiple base station transceivers implementation as opposed to the single base station transceiver implementation can provide information signals that are easier to separate. Separation is easier because the multiple base station transceivers antennas transmit information signals which are received at angles of arrival that are typically greater than the angles of arrival of signals transmitted by single base station transceiver antennas.

Diversity communication is a technique used in multiple antenna-based communication system to reduce the effects of multi-path fading. Transmitter diversity can be obtained by providing a transmitter with two or more (N) antennas. These N antennas imply N channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

Two types of diversity communication implementations are possible. The first includes a single base station transceiver, the second includes multiple base station transceivers. In the single base station transceiver implementation, the transmitter antennas that are used for transmitting information signals are elements of an antenna array at a base transceiver station. In the multiple base station transceivers implementation, transmitter antenna elements or antenna arrays are located at two or more base station transceivers. The multiple base station transceivers implementation as opposed to the single base station transceiver implementation can provide enhanced diversity gain. Diversity gain is improved because the multiple base station transceivers antennas transmit information signals which are received at angles of arrival that are typically greater than the angles of arrival of signals transmitted by single base station transceiver antennas, and therefore experience highly independent fading characteristics.

Figure 3A:
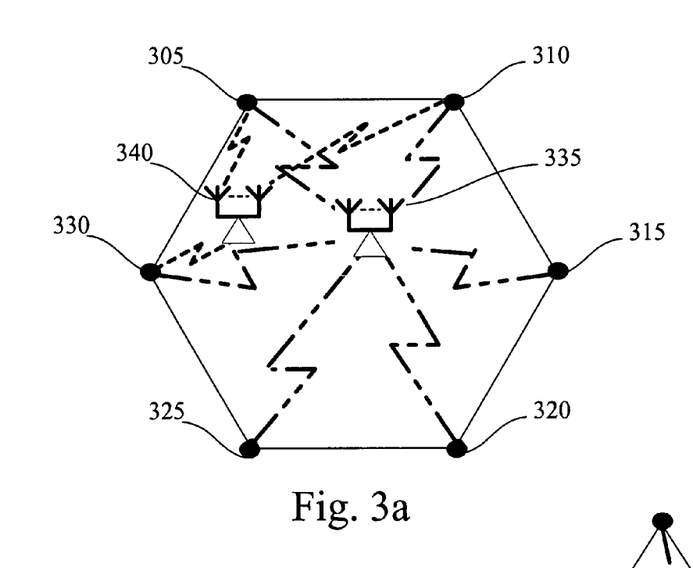
FIGS. 3a, 3b and 3c show several different cell architectures for cellular wireless systems.
Figure 3B:
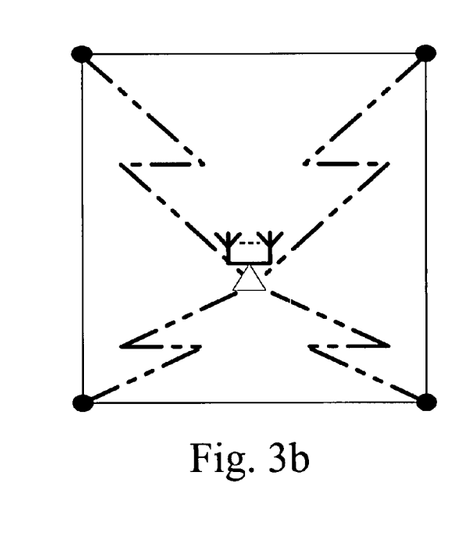
Figure 3C:
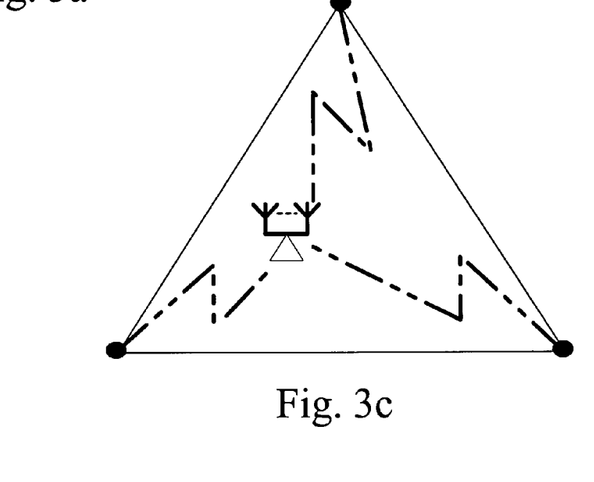

FIGS. 3a, 3b and 3c show several different cell architectures for cellular wireless systems. Each structure includes several base transceiver stations. For example, FIG. 3a includes base transceiver stations 305, 310, 315, 320, 325 and 330. FIG. 3a further includes a first subscriber unit 335 and a second subscriber unit 340. The first subscriber unit 335 receives information signals from the base transceiver stations 305, 310, 315, 320, 325 and 330. The second subscriber unit 340 receives information signals from the base transceiver stations 305, 310, 330.

Spatial processing is possible because the subscriber units 335, 340 receive signals from more than one base transceiver station. Therefore, the invention provides a re-use structure that can provide spatial multiplexing or diversity communication.

An embodiment of the invention includes the base transceiver 305, 310, 315, 320, 325 and 330 transmitting information signals at the same carrier frequency. This embodiment further includes the carrier frequency of the cell structure being adjustable to any one of several pre-selected frequencies. Additionally, this embodiment includes repeating the cell structure shown in FIG. 3a, in which the pre-selected frequencies are repeated for each of the cells. The pre-selected frequencies are also referred to as common channels. Therefore, repeating the cell structure includes repeating the common channels. This embodiment can also be extended so that a common channel is defined by the same time slot in a time-division multiple access protocol system, the same frequency slot in frequency-division multiple access protocol system, the same code sequence in code-division multiple access protocol system or the same spatial target location in space-division multiple access protocol system.

Figure 4:
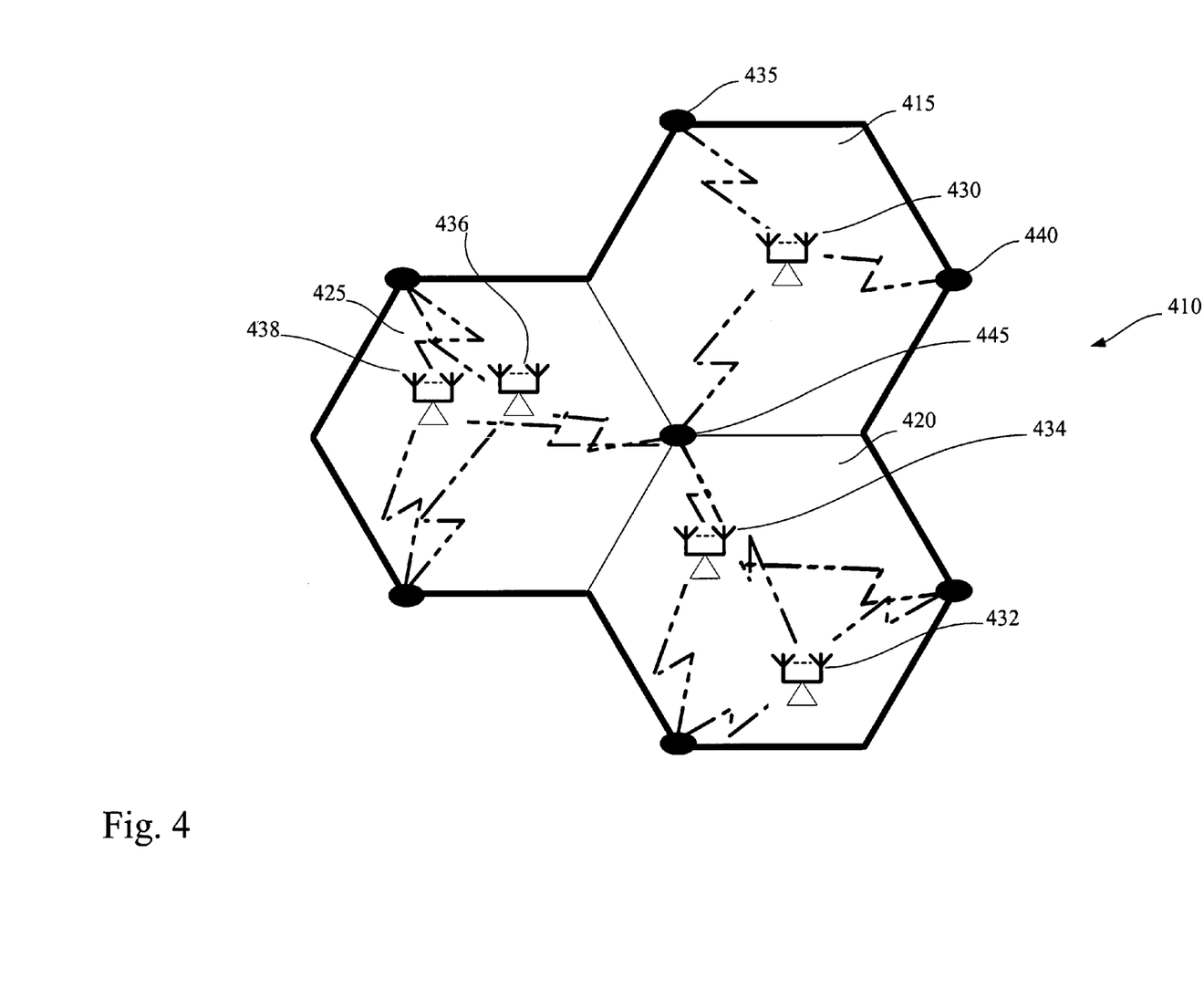
FIG. 4 shows a three-cell cluster according to an embodiment of the invention.

FIG. 4 shows another embodiment of the invention. This embodiment includes a cluster 410 of wireless re-use cells 415, 420, 425. Subscriber units 430, 432, 434, 436, 438 within each of the cells 415, 420, 425 can receive information carrier signals from several base transceiver stations. For example, a first subscriber unit 430 receives carrier signals from a first base transceiver station 435, a second base transceiver station 440 and a third base transceiver station 445.

Figure 5:
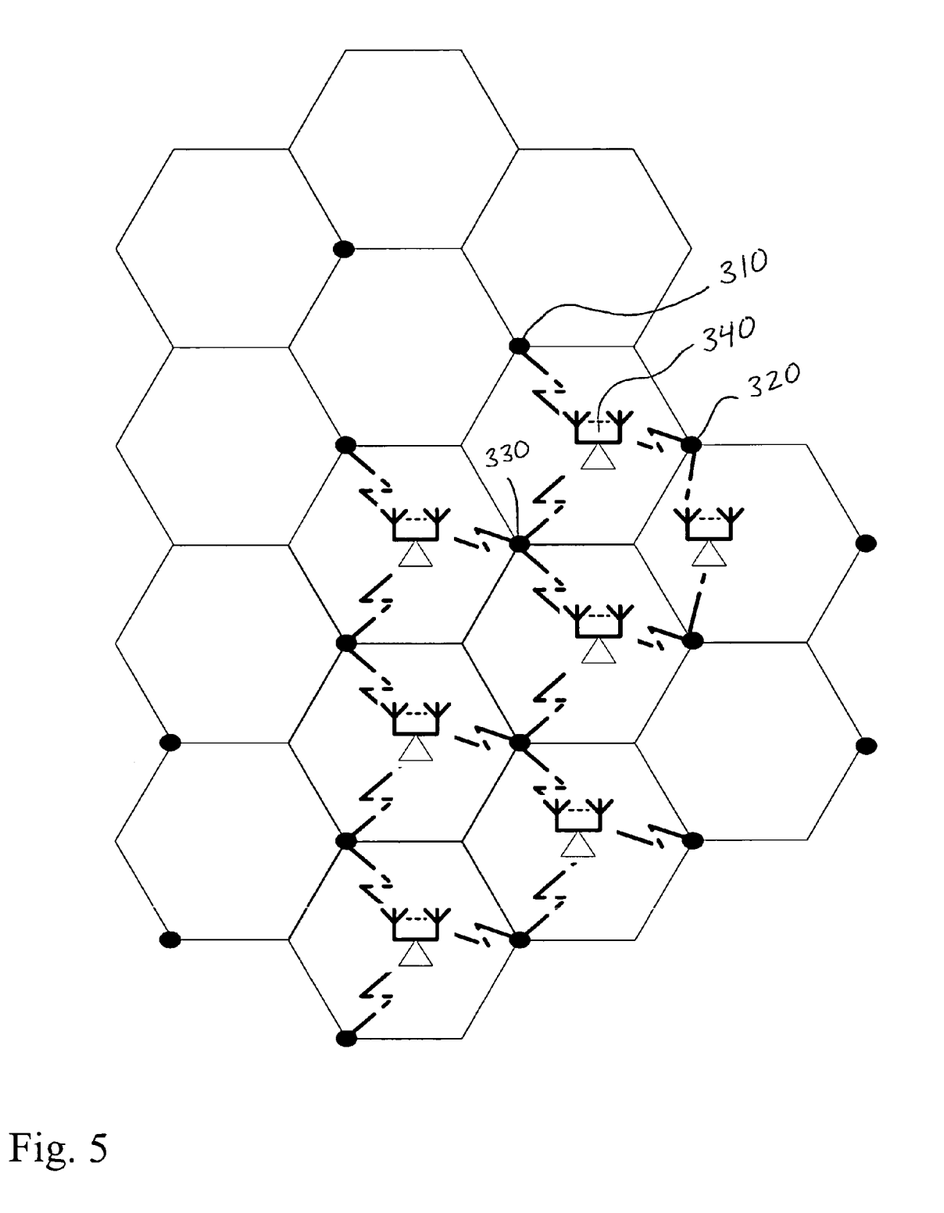
FIG. 5 shows a cell architecture of FIG. 3a repeated to form an array of cells. Each cell includes the same pre-selected transmission channels.

As described above, the carrier signals are transmitted from the base transceiver stations 435, 440, 445 to the first subscriber unit 430 over the same transmission channel. Also as described above, each cell includes multiple pre-selected transmission channels. However, this embodiment includes three cells 415, 420, 425 per cluster 410. Each cell includes a unique set of multiple pre-selected transmission channels. As will be described later, the cluster 410 is repeated. Therefore, the pre-selected channels of each cluster 410 are repeated, or re-used FIG. 5 shows a cell architecture of FIG. 3a repeated to form an array of cells. Each cell includes the same pre-selected transmission channels. It can be appreciated that single cell structures suffer from high interference between cells. That is, a receiver in one cell will receive some interference signals from neighboring cells because the neighboring cells share a common transmission channel. As mentioned earlier, the interference between cells having common transmission channels is termed "co-channel interference."

Co-channel interference can be minimized through interference canceling techniques. Generally, interference canceling techniques are well known. However, multiple signals as provided by spatial diversity, and spatially processing the signals received by multiple antenna allows for improved interference canceling techniques.

Figure 6:
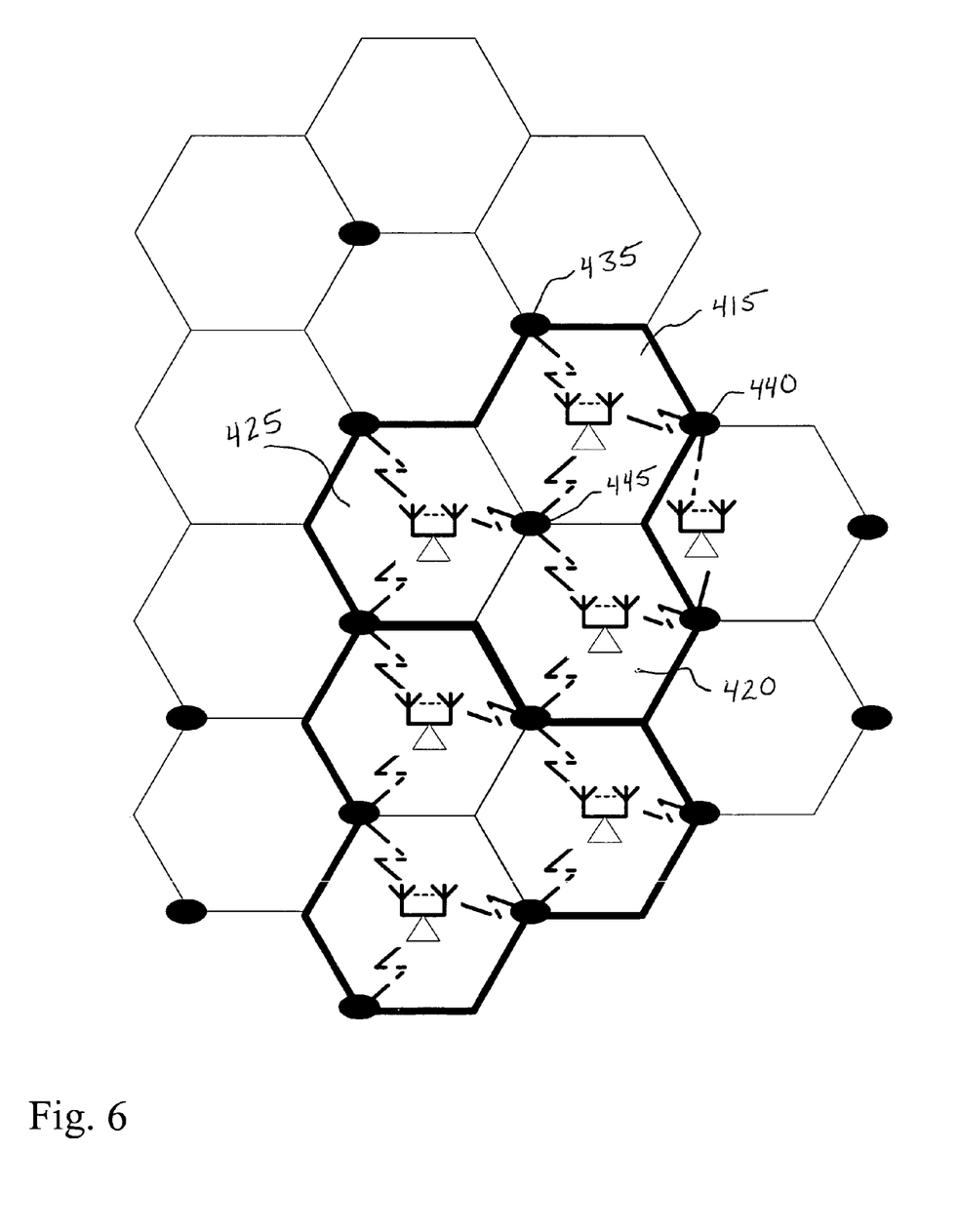
FIG. 6 shows the three cell structure of FIG. 4 repeated to form an array of cells. Each cluster includes the same pre-selected transmission channels.

FIG. 6 shows the three cell structure of FIG. 4 repeated to form an array of cells. Each cluster includes the same pre-selected transmission channels. As depicted, each cluster (high-lighted) includes three cells. It can be appreciated that the interference between clusters is less for the array of cluster of FIG. 6 than for the array of clusters of FIG. 5. The clusters of the array of FIG. 6 include three cells whereas the clusters of the array of FIG. 5 include one cell. The spatial re-use of FIG. 6 is less than the spatial re-use of FIG. 5, and the resulting signal co-channel interference is less.

Figure 7:
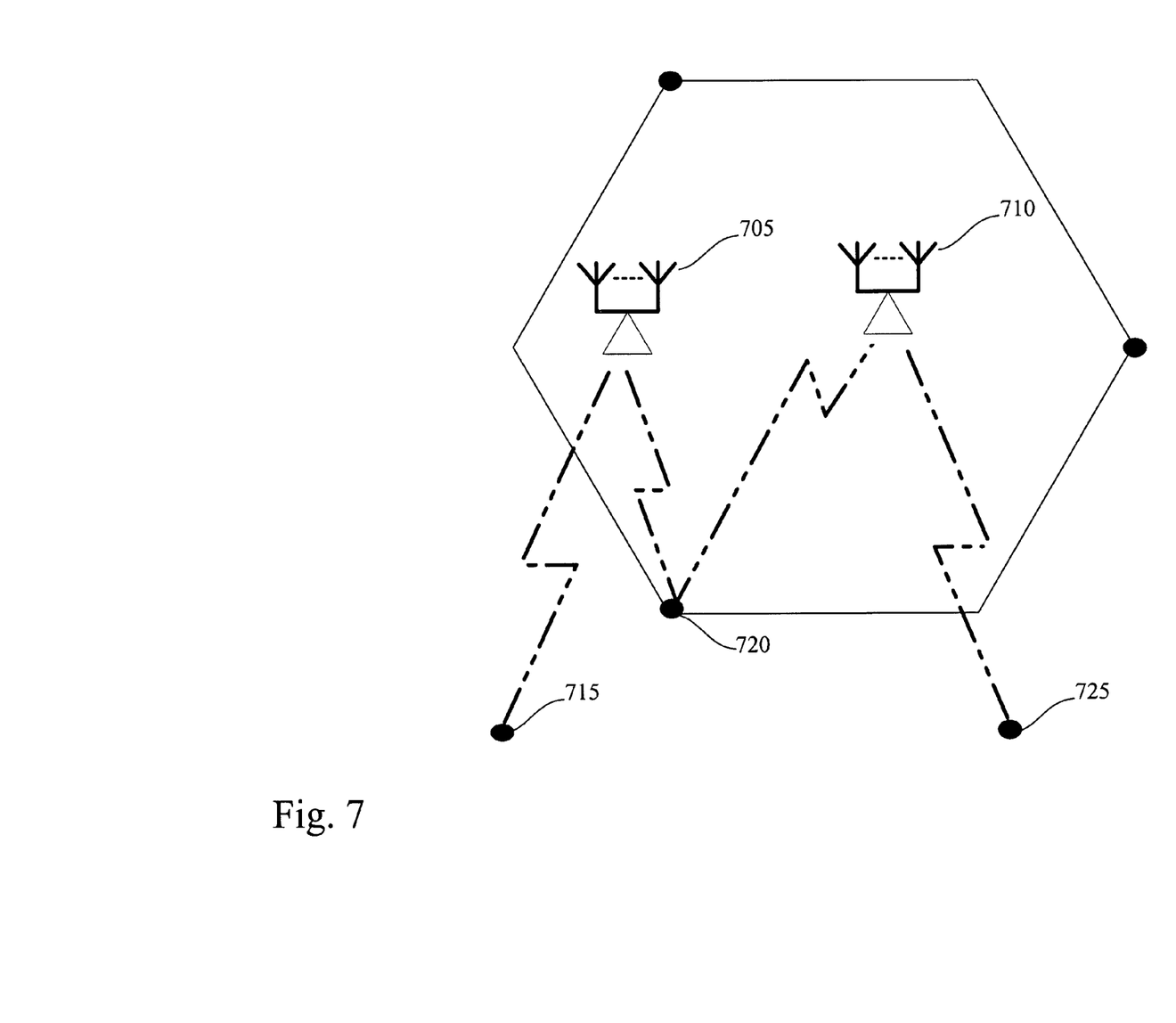
FIG. 7 shows another embodiment of the invention.

FIG. 7 shows another embodiment of the invention. This embodiment includes subscriber units 705, 710 receiving information carrier signals from base transceiver units 715, 720, 725 that are physically located both within and outside of the cell/sector each subscriber unit is located. That is, first subscriber unit 705 receives information carrier signals from first base transceiver unit 715 and second base transceiver unit 720. Second subscriber unit 710 receives information carrier signals from second base transceiver unit 720 and third base transceiver unit 725.

The information carrier signals can include the previously described substreams of information symbols. That is, the first subscriber unit 705 and the second subscriber unit 710 can receive separate information symbol streams from more than one base transceiver units. Therefore, the previously described spatial multiplexing and diversity communication can be realized. However, it should be noted that the substreams are independent in the case of spatial multiplexing, but are copies or versions of the same information stream in the case of diversity communication.

The first base transceiver unit 715 and the third base transceiver unit 725 are located outside of the cell in which the first subscriber unit 705 and the second subscriber unit 710 are located. The first base transceiver unit 715 and the third base transceiver unit 725, however, share the same common channels, along with the second base transceiver unit 720, for subscriber units located in common cells or common channel areas within the cells or clusters. A common channel area is a physical area that a subscriber unit within the area receives information signals from base transceiver units having selected predetermined transmission characteristics. Therefore, as previously described, within the common channel areas, spatial multiplexing and diversity communication can be realized.

Figure 8:
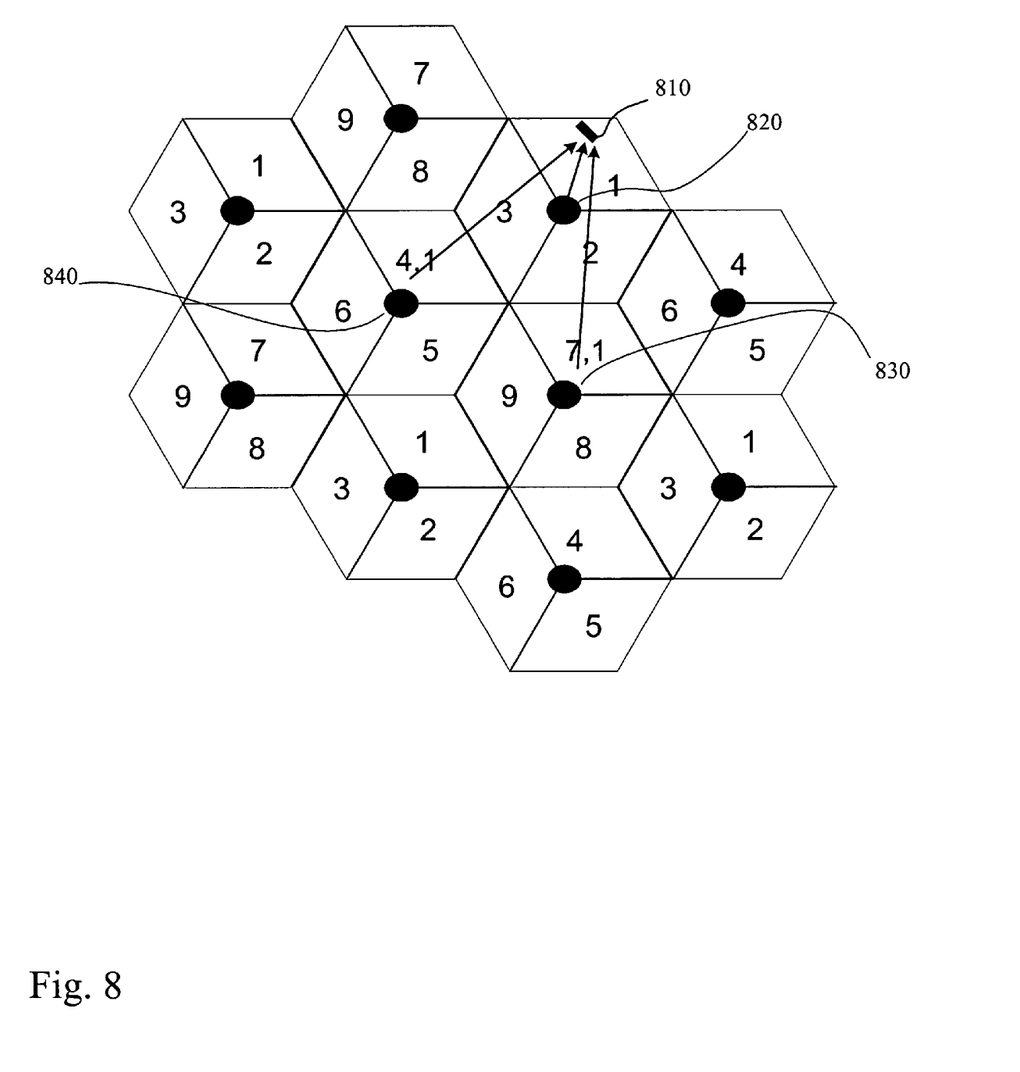
FIG. 8 shows an overlay of an out-cell spatial multiplexing architecture on a regular 3×3 re-use cell structure.

FIG. 8 shows an overlay of an out-cell spatial multiplexing architecture on a regular 3×3 re-use cell structure. For out-cell spatial multiplexing, at least one of the base station transceivers generating signals within the common assigned channel corresponding to the common channel area of a corresponding subscriber unit, is located outside of the common channel area. The cell structure of FIG. 8 includes clusters of three cells. Each cell is divided into three sectors. Each sector includes a different common channel or information carrier signal frequency. A subscriber unit 810 receives information carrier signals from base transceiver stations 820, 830, 840 located both inside and outside of the cell and/or sector the subscriber unit 810 is located.

For FIG. 8, each sector 1, 2, 3, 4, 5, 6, 7, 8, 9 includes a unique set of transmission channels or information signal carrier frequencies. First base transceiver station 820 is located within sector 1. However, second base transceiver station 830 and third base transceiver station 840 can include the same signal channel or transmission frequency to allow the second base transceiver station 830 and third base transceiver station 840 to transmit information signals to the subscriber unit 810 simultaneously with the first base transceiver station 820 transmitting information signals to the subscriber unit 810.

Figure 9:
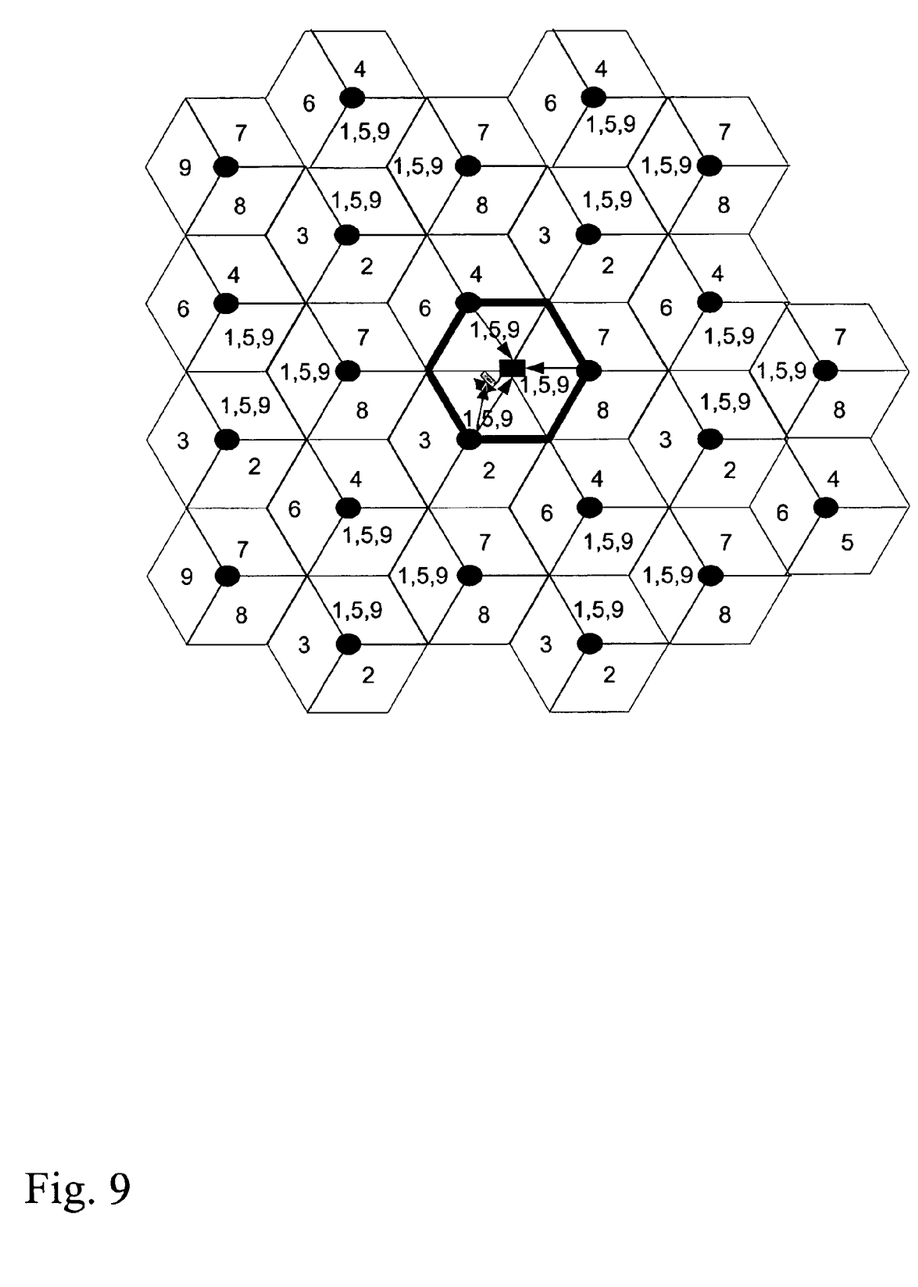
FIG. 9 shows an overlay of an in-cell spatial multiplexing architecture on a regular 3×3 re-use cell structure.

FIG. 9 shows an overlay of an in-cell spatial multiplexing architecture on a regular 3×3 re-use cell structure. For in-cell spatial multiplexing, base station transceivers generating signals within the common assigned channel characteristic corresponding to the common channel area of a corresponding subscriber unit, are located inside the common channel area. Within the common channel area (high-lighted) of FIG. 9, subscriber units can receive information signals from three separate base transceiver stations. By adding additional transmission channels to the base station transceivers of a regular 3×3 re-use cell structure, common channel areas can be created.

A regular 3×3 re-use cell structure can include a three cell cluster. As shown in FIG. 9, the three cell cluster can include a first cell that includes a first sector 1 having a first transmission channel, a second sector 2 having a second transmission channel and a third sector 3 having a third transmission channel. The three cell cluster can further include a second cell that includes a fourth sector 4 having a fourth transmission channel, a fifth sector 5 having fifth transmission channel and sixth sector 6 having a sixth transmission channel. The three cell cluster can further include a third cell that includes a seventh sector 7 having a seventh transmission channel, an eighth sector 8 having an eighth transmission channel and a ninth sector 9 having a ninth transmission channel. By adding transmission channels to each sector common channel areas can be created, and subscriber units within a common channel area can receive multiple information signals. For example, by adding a fifth channel and a ninth channel to the base transceiver station within the first sector 1, adding a first channel and a ninth channel to the base transceiver station within the fifth sector 5, and adding a first channel and a fifth channel to the base transceiver station within the ninth sector 9, a common channel area (high-lighted) is formed by the first sector 1, the fifth sector 5 and the ninth sector 9. Therefore, subscriber units within the high-lighted common area can receive information signals from three base station transceivers at either the first transmission channel, the fifth transmission channel or the ninth transmission channel.

Subscriber units within common channel areas can also receive interference signals from neighboring common channel areas that have common transmission channels. For example, as shown in FIG. 9, other common channel areas include the first transmission channel, the fifth transmission channel and the ninth transmission channel. Therefore, co-channel interference will generally be present. However, the structure shown in FIG. 9 has minimized co-channel interference because the common channel areas are physically spaced apart. Therefore, the interference is weak. Additionally, the structure is uniform. Therefore, the interference is uniform.

The overlay of an in-cell spatial multiplexing architecture on a regular 3×3 re-use cell structure of FIG. 9, is adaptable to broadband wireless internet access because internet access is generally very bursty. That is, internet access information transferred between base transceiver stations and subscriber unit tends to occur in bursts. The resulting bursty interference is generally difficult to cancel. However, the uniform low-level interference characteristics of the structure of FIG. 9, can be used to limit the effects of bursty interference within broadband wireless internet access systems.

Although specific embodiments of the invention have been described and illustrated, the invention is not to be limited to the specific forms or arrangements of parts so described and illustrated. The invention is limited only by the claims.

What is claimed is:

1. A cellular wireless re-use communication system comprising:
   a base transceiver station cluster, the base transceiver station cluster comprising:
      a first plurality of base station transceivers; and
      a plurality of common channel areas, each common channel area having a unique set of common assigned channels;
      each common channel area comprising at least one subscriber unit, each subscriber unit within the common channel area receiving and recovering information signals from both the first and a second plurality of base station transceivers through one of the set of common assigned channels that correspond to the common channel area, wherein the first and second plurality of base station transceivers spatially multiplex a common information signal to the subscriber unit.

2. The cellular wireless re-use communication system of claim 1, further comprising a plurality of base transceiver station clusters.

3. The cellular wireless re-use communication system of claim 1, wherein each common assigned channel comprises a common transmission characteristic.

4. The cellular wireless re-use communication system of claim 3, wherein the common transmission characteristic is a transmission frequency.

5. The cellular wireless re-use communication system of claim 3, wherein the common transmission characteristic is a transmission time.

6. The cellular wireless re-use communication system of claim 3, wherein the common transmission characteristic is a transmission code.

7. The cellular wireless re-use communication system of claim 3, wherein the common transmission characteristic is at least one of: a frequency-division, a time-division, a spatial-division, a code-division, orthogonal frequency division multiple access (OFDMA), wavelength division multiple access (WDMA), wavelet division multiple access techniques.

8. The cellular wireless re-use communication system of claim 1, wherein the second plurality of base station transceivers generating signals within the common assigned channel corresponding to the common channel area of a corresponding subscriber unit, are located within the common channel area.

9. The cellular wireless re-use communication system of claim 1, wherein at least one of the second plurality of base station transceivers generating signals within the common assigned channel characteristic corresponding to the common channel area of a corresponding subscriber unit, are located outside of the common channel area.

10. The cellular wireless re-use communication system of claim 1, wherein the subscriber unit receiving information signals from a second plurality of base station transceivers rough a one of the set of common assigned channels, allows for spatial multiplexing.

11. The cellular wireless re-use communication system of claim 1, wherein the subscriber unit receiving information signals from a second plurality of base station transceivers through a one of the set of common assigned channels, allows for communication diversity.

12. The cellular wireless re-use communication system of claim 1, wherein the communication diversity comprises transmitter diversity.

13. The cellular wireless re-use communication system of claim 1, wherein the communication diversity comprises receiver diversity.

14. A cellular wireless re-use communication system comprising:
  a plurality of base transceiver station clusters, each base transceiver station cluster comprising:
  at least one base station transceiver; and
  at least one common channel area, each common channel area having a unique set of common assigned channels;
  each common channel area comprising at least one subscriber unit, each subscriber unit within the common channel area receiving and recovering information signals from both the first and a second plurality of base station transceivers through one of the set of common assigned channels that correspond to the common channel area, wherein the first and second plurality of base station transceivers spatially multiplex a common information signal to the subscriber unit.

15. A method of transmitting multiple information signals to at least one subscriber unit within a cellular wireless re-use communication system, the system comprising a base transceiver station cluster, the base transceiver station cluster comprising a first plurality of base station transceivers, and a plurality of common channel areas, each common channel area having a unique set of common assigned channels, each common channel area comprising at least one subscriber unit, the method comprising:
  a second plurality of base station transceivers transmitting information signals through one of the set of common assigned channels that correspond to the common channel area; and
  each subscriber unit within the common channel area receiving and recovering information signals from both the first and a second plurality of base station transceivers through one of the set of common assigned channels that correspond to the common channel area, wherein the first and second plurality of base station transceivers spatially multiplex a common information signal to the subscriber unit.

16. The method of transmitting multiple information signals to at least one subscriber unit within a cellular wireless re-use communication system of claim 15, wherein each common assigned channel comprises a common transmission characteristic.

17. The method of transmitting multiple information signals to at least one subscriber unit within a cellular wireless re-use communication system of claim 16, wherein the common transmission characteristic is a transmission frequency.

18. The method of transmitting multiple information signals to at least one subscriber unit within a cellular wireless re-use communication system of claim 16, wherein the second plurality of base station transceivers transmitting signals within the common assigned channel corresponding to the common channel area of a corresponding subscriber unit, are located within the common channel area.

19. The method of transmitting multiple information signals to at least one subscriber unit within a cellular wireless re-use communication system of claim 16, wherein the second plurality of base station transceivers transmitting signal within the common assigned channel corresponding to the common channel area of a corresponding subscriber unit, are located outside of the common channel area.

20. The method of transmitting multiple information signals to at least one subscriber unit within a cellular wireless re-use communication system of claim 16, wherein the common transmission characteristic is at least one of: a frequency-division, a time division, a spatial-division, a code-division, orthogonal frequency division multiple access (OFDMA), wavelength division multiple access (WDMA), wavelet division multiple access techniques.

* * * * *